United States Patent
Rao et al.

(10) Patent No.: US 12,051,902 B2
(45) Date of Patent: Jul. 30, 2024

(54) VOLTAGE SOURCE CONVERTER BASED HIGH VOLTAGE DIRECT CURRENT (VSC-HVDC) HIGH-FREQUENCY RESONANCE SUPPRESSION METHOD, SYSTEM, AND DEVICE

(71) Applicant: ELECTRIC POWER RESEARCH INSTITUTE. CHINA SOUTHERN POWER GRID, Guangdong (CN)

(72) Inventors: Hong Rao, Guangdong (CN); Guiyuan Li, Guangdong (CN); Weihuang Huang, Guangdong (CN); Yan Li, Guangdong (CN); Shukai Xu, Guangdong (CN)

(73) Assignee: ELECTRIC POWER RESEARCH INSTITUTE. CHINA SOUTHERN POWER GRID, Guangzhou (CN)

( * ) Notice: Subject to any disclaimer, the term of this patent is extended or adjusted under 35 U.S.C. 154(b) by 0 days.

(21) Appl. No.: 18/105,843

(22) Filed: Feb. 4, 2023

(65) Prior Publication Data
US 2023/0187940 A1  Jun. 15, 2023

Related U.S. Application Data

(63) Continuation-in-part of application No. PCT/CN2020/129620, filed on Nov. 18, 2020.

(30) Foreign Application Priority Data

Aug. 4, 2020  (CN) .......................... 202010772525.2

(51) Int. Cl.
*H02J 3/24* (2006.01)
*H02J 3/00* (2006.01)
(Continued)

(52) U.S. Cl.
CPC .......... *H02J 3/241* (2020.01); *H02J 3/00125* (2020.01); *H02J 3/06* (2013.01); *H02J 2003/365* (2013.01)

(58) Field of Classification Search
None
See application file for complete search history.

(56) References Cited

U.S. PATENT DOCUMENTS

2016/0285378 A1* 9/2016 Oates ...................... H02M 1/12
2017/0009744 A1* 1/2017 Brogan .................... H02J 3/36
(Continued)

FOREIGN PATENT DOCUMENTS

CN          109802420 A        5/2019

*Primary Examiner* — Jared Fureman
*Assistant Examiner* — Joel Barnett

(57) ABSTRACT

Disclosed are a voltage source converter based high voltage direct current (VSC-HVDC) high-frequency resonance suppression method, system, and device. The method includes: when an effective value of an actually input alternating current (AC) voltage is reduced from a normal value to meet a preset condition, making the virtual electrical quantity completely equal to the actual electrical quantity, and performing full real-time tracking for the actual electrical quantity to improve dynamic characteristics of a power system at the moment of a fault; and after performing the full tracking for a period of time, if the effective value of the actual AC voltage is less than a preset threshold, performing adaptive tracking until the actual electrical quantity recovers to a stable value. The present disclosure can reduce a risk of high-frequency resonance of a VSC-HVDC, avoid deteriorating dynamic characteristics of the VSC-HVDC, and improve safety of fault ride-through of the VSC-HVDC.

14 Claims, 5 Drawing Sheets

(51) Int. Cl.
*H02J 3/06* (2006.01)
*H02J 3/36* (2006.01)

(56) References Cited

U.S. PATENT DOCUMENTS

2019/0140441 A1\* 5/2019 Li ......................... H02H 7/262
2020/0295568 A1\* 9/2020 Liu ........................ H02J 3/241

\* cited by examiner

VOLTAGE SOURCE CONVERTER BASED HIGH VOLTAGE DIRECT CURRENT (VSC-HVDC) HIGH-FREQUENCY RESONANCE SUPPRESSION METHOD, SYSTEM, AND DEVICE

CROSS REFERENCE TO RELATED APPLICATIONS

The present application is a Continuation-In-Part Application of PCT Application No. PCT/CN2020/129620 filed on Nov. 18, 2020, which claims the benefit of Chinese Patent Application No. 202010772525.2 filed on Aug. 4, 2020. All the above are hereby incorporated by reference in their entirety.

TECHNICAL FIELD

The present disclosure relates to the power field, and in particular, to a voltage source converter based high voltage direct current (VSC-HVDC) high-frequency resonance suppression method, system, and device.

BACKGROUND

VSC-HVDC transmission is a development trend of a power system. In the VSC-HVDC transmission, several key technical problems need to be resolved, and one of the technical problems is to suppress high-frequency resonance between VSC-HVDC and alternating current (AC) systems. A VSC-HVDC converter presents negative impedance, and resonance caused by amplifying a system harmonic is mainly caused by an impedance mismatch between the VSC-HVDC converter and the AC system. The resonance is mainly related to a control link delay and a feedforward strategy. For the resonance, a main solution in a current VSC-HVDC project is to reasonably configure a filter in a feedforward procedure of an inner loop controller of a VSC-HVDC station. The research shows that the filter increases a delay in the voltage feedforward procedure, which greatly affects dynamic characteristics of the system under some working conditions. A main technical difficulty is to avoid deteriorating the dynamic characteristics of the system while ensuring a resonance suppression effect.

Based on engineering application experience at home and abroad, a low-pass filter and a nonlinear filter can be used. Their advantages and disadvantages are compared as follows:
1) The feedforward low-pass filter cannot completely filter out a harmonic in a high frequency band, and further increases the delay in the voltage feedforward procedure, which makes the high-frequency resonance shift to a lower-frequency direction, resulting in medium-frequency and high-frequency resonance. In addition, the delay affects AC fault ride-through performance of a VSC-HVDC transmission system.
2) Compared with the feedforward low-pass filter, to some extent, the feedforward nonlinear filter can alleviate high-frequency resonance caused by the impedance mismatch between the VSC-HVDC and AC systems, but the improvement is limited. The feedforward nonlinear filter can perform adjustment based on an AC voltage in the event of an AC fault and other voltage disturbances, and reduce an overcurrent risk of a converter valve to some extent. However, the overcurrent risk of the converter valve still exists in a weak AC system.

To sum up, in the prior art, when the filter is used to suppress the VSC-HVDC high-frequency resonance, there will be a technical problem of deteriorating the dynamic characteristics of the power system.

SUMMARY

The present disclosure provides a VSC-HVDC high-frequency resonance suppression method, system, and device, so as to resolve a prior-art technical problem that dynamic characteristics of a power system are deteriorated when a filter is used to suppress high-frequency resonance of a VSC-HVDC transmission line.

The present disclosure provides a VSC-HVDC high-frequency resonance suppression method, where the method is applicable to a virtual grid adaption controller pre-installed in a feedforward procedure of a VSC-HVDC inner loop controller, and the method includes following steps:
S1: detecting a dq-axis component of an actual AC voltage of a VSC-HVDC transmission line in real time, and calculating an effective value of the actual AC voltage based on the dq-axis component of the actual AC voltage;
S2: comparing the effective value of the actual AC voltage with a preset voltage threshold, and sending a pulse signal of certain duration to the virtual grid adaption controller when the effective value of the actual AC voltage decreases from 1 pu to less than the voltage threshold;
S3: making the virtual grid adaption controller generate, within the duration of the pulse signal, a virtual voltage whose dq-axis component is completely equal to the dq-axis component of the actual AC voltage, tracking the actual AC voltage, and ending full tracking when tracking time of the virtual grid adaption controller for the actual AC voltage reaches a preset time threshold; and
S4: detecting a dq-axis component of a current actual AC voltage, calculating an effective value of the current actual AC voltage based on the dq-axis component of the current actual AC voltage, calculating a deviation between the dq-axis component of the current actual AC voltage and a dq-axis component of a virtual voltage at the end of the tracking if the effective value of the current actual AC voltage is less than the voltage threshold, correcting, based on the deviation, the virtual voltage output by the virtual grid adaption controller, performing adaptive tracking for the actual AC voltage, and ending the adaptive tracking when it is detected that the effective value of the actual AC voltage is greater than the voltage threshold.

Preferably, the detecting a dq-axis component of an actual AC voltage of a VSC-HVDC transmission line in real time specifically includes:
collecting the actual AC voltage of the VSC-HVDC transmission line in real time, and transforming the actual AC voltage in a dq coordinate system to obtain a positive-sequence dq-axis component and a negative-sequence dq-axis component of the actual AC voltage.

Preferably, in the S2, the duration of the pulse signal ranges from 2 ms to 15 ms.

Preferably, in the S2, the voltage threshold ranges from 0.7 pu to 0.9 pu.

Preferably, in the S4, the calculating a deviation between the dq-axis component of the current actual AC voltage and a dq-axis component of a virtual voltage at the end of the tracking, and correcting, based on the deviation, the virtual voltage output by the virtual grid adaption controller specifically includes:

obtaining a positive-sequence dq-axis component and a negative-sequence dq-axis component of the current actual AC voltage, calculating an average value of positive-sequence dq-axis components of N sampling points to obtain an average value of the positive-sequence dq-axis component of the actual AC voltage, and calculating an average value of negative-sequence dq-axis components of the N sampling points to obtain an average value of the negative-sequence dq-axis component of the actual AC voltage;

comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;

if the deviations are between a preset positive threshold and a preset negative threshold, taking the virtual voltage at the end of the full tracking as the virtual voltage output by the virtual grid adaption controller;

if the deviations are greater than a preset positive threshold, taking a sum of the virtual voltage at the end of the tracking and a preset fixed gradient as the virtual voltage output by the virtual grid adaption controller; or if the deviations are less than a preset negative threshold, taking a value of subtracting a preset fixed gradient from the virtual voltage at the end of the tracking threshold as the virtual voltage output by the virtual grid adaption controller; and ending the process when it is detected that the effective value of the actual AC voltage is greater than the voltage threshold.

A VSC-HVDC high-frequency resonance suppression system is provided, where the system is applicable to a virtual grid adaption controller pre-installed in a feedforward procedure of a VSC-HVDC inner loop controller, and the system includes an effective actual AC voltage calculation module, a comparison module, a tracking module, and an adaptive tracking module, where the effective actual AC voltage calculation module is configured to detect a dq-axis component of an actual AC voltage of a VSC-HVDC transmission line in real time, and calculate an effective value of the actual AC voltage based on the dq-axis component of the actual AC voltage;

the comparison module is configured to compare the effective value of the actual AC voltage with a preset voltage threshold, and send a pulse signal of certain duration to the virtual grid adaption controller when the effective value of the actual AC voltage decreases from 1 pu to less than the voltage threshold;

the tracking module is configured to make the virtual grid adaption controller generate, within the duration of the pulse signal, a virtual voltage whose dq-axis component is completely equal to the dq-axis component of the actual AC voltage, track the actual AC voltage, and end full tracking when tracking time of the virtual grid adaption controller for the actual AC voltage reaches a preset time threshold; and the adaptive tracking module is configured to detect a dq-axis component of a current actual AC voltage, calculate an effective value of the current actual AC voltage based on the dq-axis component of the current actual AC voltage, calculate a deviation between the dq-axis component of the current actual AC voltage and a dq-axis component of a virtual voltage at the end of the tracking if the effective value of the current actual AC voltage is less than the voltage threshold, correct, based on the deviation, the virtual voltage output by the virtual grid adaption controller, perform adaptive tracking for the actual AC voltage, and end the adaptive tracking when it is detected that the effective value of the actual AC voltage is greater than the voltage threshold.

Preferably, the effective actual AC voltage calculation module is specifically configured to:

collect the actual AC voltage of the VSC-HVDC transmission line in real time, and transform the actual AC voltage in a dq coordinate system to obtain a positive-sequence dq-axis component and a negative-sequence dq-axis component of the actual AC voltage; and calculate the effective value of the actual AC voltage based on the positive-sequence dq-axis component and the negative-sequence dq-axis component of the actual AC voltage.

Preferably, the duration of the pulse signal in the comparison module ranges from 2 ms to 15 ms, and the voltage threshold ranges from 0.7 pu to 0.9 pu.

Preferably, that the adaptive tracking module calculates the deviation between the dq-axis component of the current actual AC voltage and the dq-axis component of the virtual voltage at the end of the tracking, and corrects, based on the deviation, the virtual voltage output by the virtual grid adaption controller specifically includes:

obtaining a positive-sequence dq-axis component and a negative-sequence dq-axis component of the current actual AC voltage, calculating an average value of positive-sequence dq-axis components of N sampling points for the actual AC voltage to obtain an average value of the positive-sequence dq-axis component of the actual AC voltage, and calculating an average value of negative-sequence dq-axis components of the N sampling points for the actual AC voltage to obtain an average value of the negative-sequence dq-axis component of the actual AC voltage;

comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;

if the deviations are between a preset positive threshold and a preset negative threshold, taking the virtual voltage at the end of the tracking as the virtual voltage output by the virtual grid adaption controller;

if the deviations are greater than a preset positive threshold, taking a sum of the virtual voltage at the end of the tracking and a preset fixed gradient as the virtual voltage output by the virtual grid adaption controller; or if the deviations are less than a preset negative threshold, taking a value of subtracting a preset fixed gradient from the virtual voltage at the end of the tracking threshold as the virtual voltage output by the virtual grid adaption controller; and ending the process when it is detected that the effective value of the actual AC voltage is greater than the voltage threshold.

A VSC-HVDC high-frequency resonance suppression device includes a processor and a memory, where the memory is configured to store program code and transmit the program code to the processor; and the processor is configured to execute, according to instructions in the program code, the VSC-HVDC high-frequency resonance suppression method described above. It can be learned from the above technical solutions that the embodiments of the present disclosure have following advantages:

The embodiments of the present disclosure provide a VSC-HVDC high-frequency resonance suppression method. According to the VSC-HVDC high-frequency resonance suppression method, under a normal working condition, the VSC-HVDC transmission line and the virtual grid adaption controller are physically isolated completely, and a harmonic of an actual electrical quantity will not be reflected in a virtual electrical quantity, achieving harmonic suppression. When an actually input AC electrical quantity changes, the virtual electrical quantity is made to be completely equal to the actual electrical quantity, so as to perform accurate real-time tracking for the actual electrical quantity to improve dynamic characteristics of a power system at the moment of a fault; and after full tracking is performed for a period of time, adaptive tracking is performed until the actual electrical quantity recovers to a stable value. The embodiments of the present disclosure can reduce a resonance risk of a VSC-HVDC, avoid deteriorating dynamic characteristics of the VSC-HVDC transmission line under a fault condition, avoid a damage to a component or a device due to excessive stress, and improve safety of fault ride-through of the VSC-HVDC.

BRIEF DESCRIPTION OF THE DRAWINGS

To describe the technical solutions in the embodiments of the present disclosure or in the prior art more clearly, the accompanying drawings required for describing the embodiments or the prior art will be briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION

The embodiments of the present disclosure provide a VSC-HVDC high-frequency resonance suppression method, system, and device, so as to resolve a prior-art technical problem that dynamic characteristics of a power system are deteriorated when a filter is used to suppress high-frequency resonance of a VSC-HVDC transmission line.

In order to make the objectives, features and advantages of the present disclosure more obvious and easier to understand, the technical solutions in the embodiments of the present disclosure will be clearly and completely described below with reference to the accompanying drawings in the embodiments of the present disclosure. Obviously, the described embodiments are only some rather than all of the embodiments of the present disclosure. All other embodiments obtained by those of ordinary skill in the art based on the embodiments of the present disclosure without creative efforts should fall within the protection scope of the present disclosure.

Figure 1:
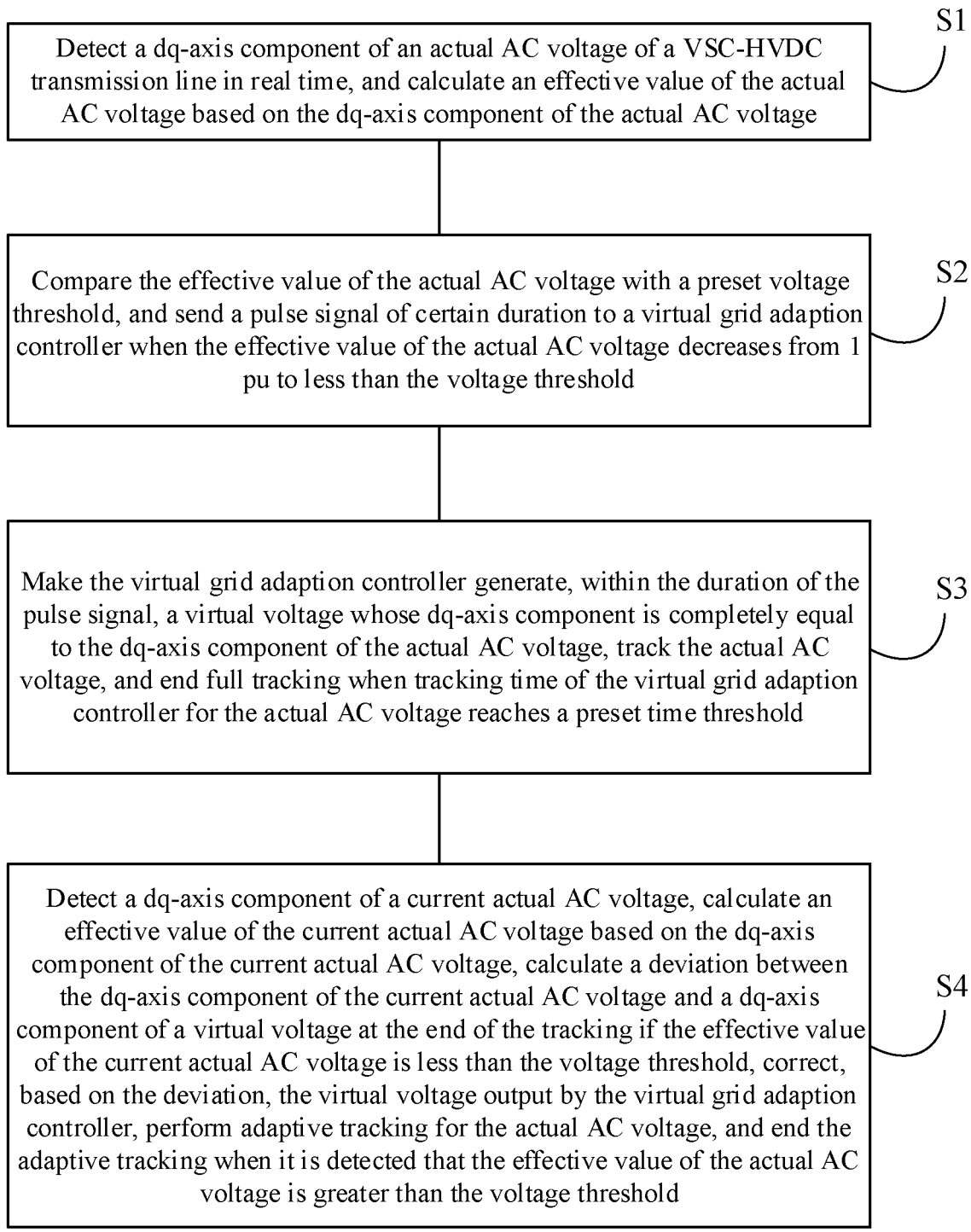
FIG. 1 is a flowchart of a VSC-HVDC high-frequency resonance suppression method according to an embodiment of the present disclosure.

FIG. 1 is a flowchart of a VSC-HVDC high-frequency resonance suppression method according to an embodiment of the present disclosure.

Figure 2:
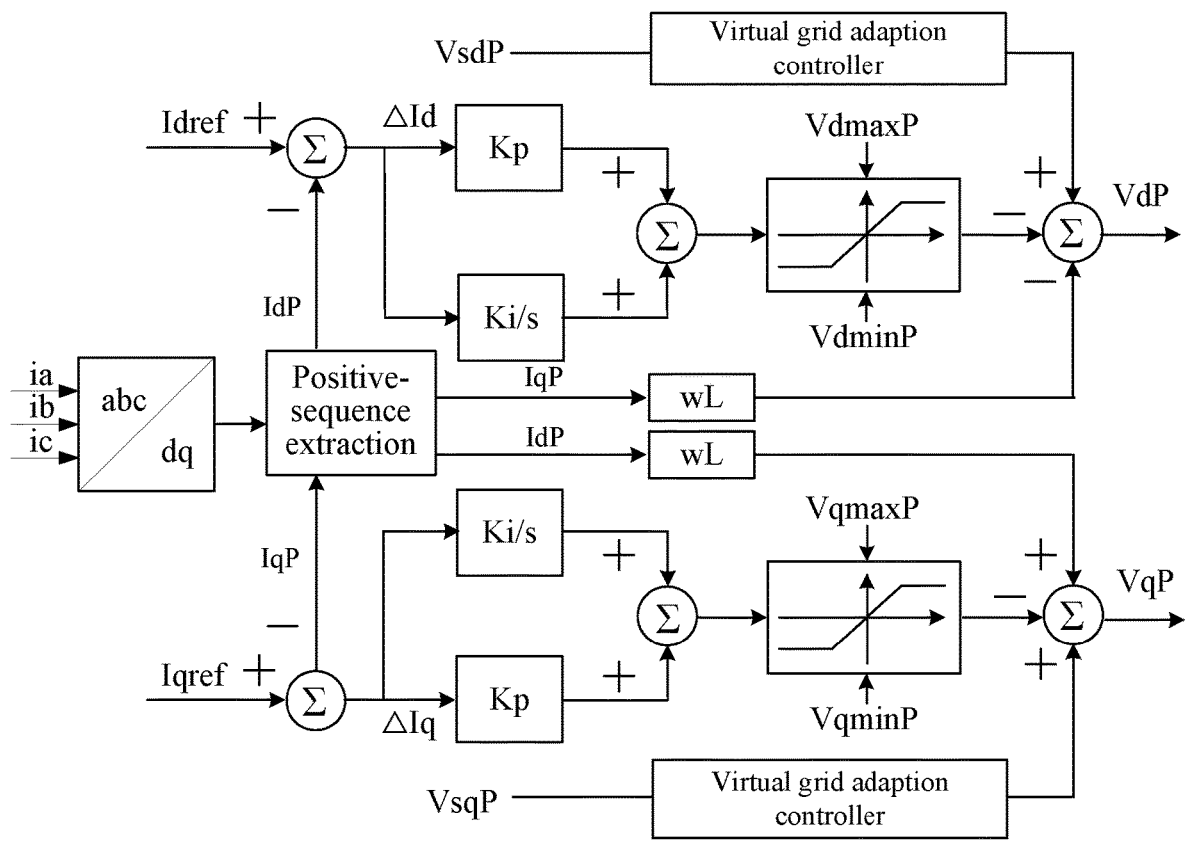
FIG. 2 is a schematic structural diagram of positive-sequence inner loop control of a VSC-HVDC transmission system in a VSC-HVDC high-frequency resonance suppression method, system, and device according to an embodiment of the present disclosure.
Figure 3:
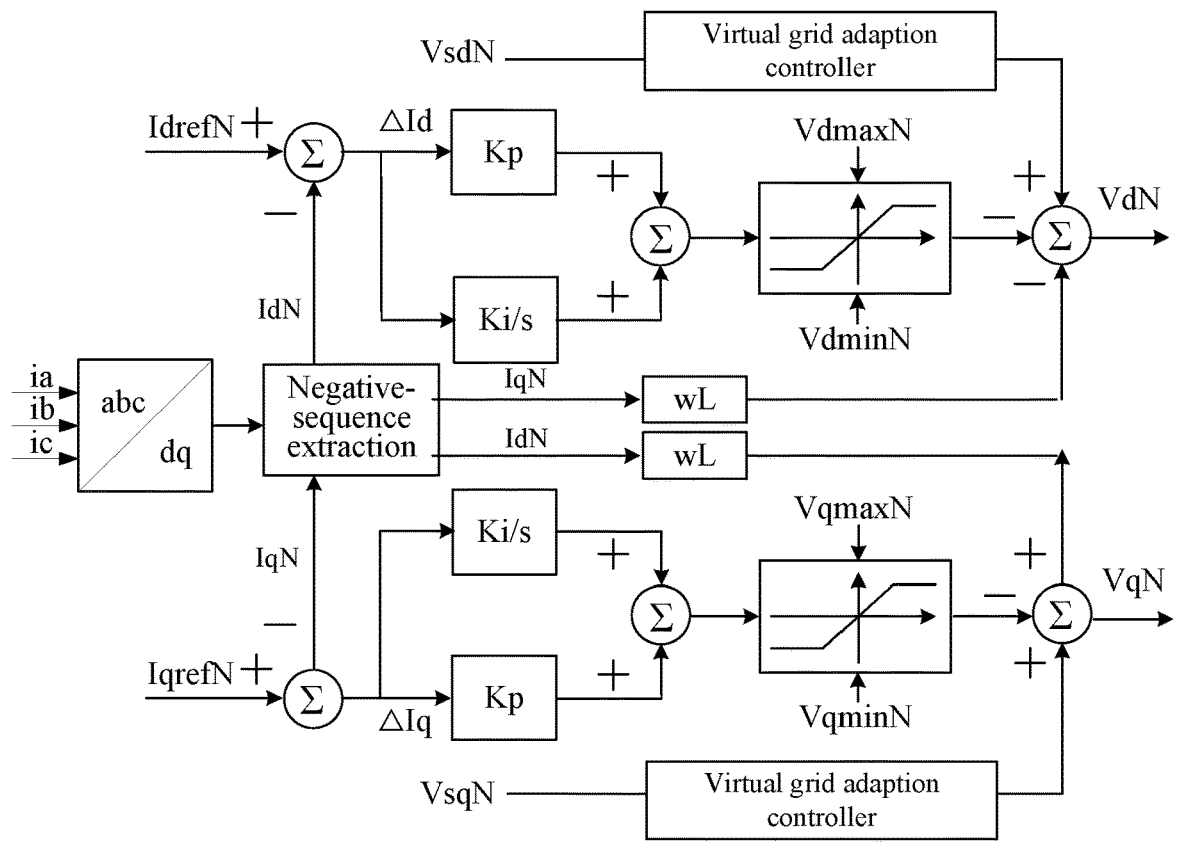
FIG. 3 is a schematic structural diagram of negative-sequence inner loop control of a VSC-HVDC transmission system in a VSC-HVDC high-frequency resonance suppression method, system, and device according to an embodiment of the present disclosure.

A control strategy of a VSC-HVDC transmission system is described first. At present, vector control based on direct current control is widely used in engineering, which is composed of an outer loop control strategy and an inner loop control strategy. Mainly based on a VSC-HVDC mathematical model in a dq rotating coordinate system, the vector control performs decoupling control for fundamental d-axis and q-axis components of a voltage on a valve side of a valve group, thus realizing power exchange between AC and direct current (DC) systems. Therefore, the vector control can effectively limit a current and has a good response characteristic. A structure of an inner loop controller is shown in FIG. 2 and FIG. 3. During VSC-HVDC inner loop control, a reference value of an active current Idref and a reference value of a reactive current Iqref from outer loop control are received. The reference currents are quickly tracked through a proportional integration procedure to control a dq component of an AC-side voltage of the valve group. An amplitude and a phase of the AC-side voltage of the valve group can be changed by changing Vd and Vq components, thus realizing the power exchange between the AC and DC systems. Double dq decoupling control (positive-sequence and negative-sequence) is adopted for current inner loop control. A positive-sequence inner loop controller tracks the reference values of the active and reactive currents. As asymmetric fault control, negative-sequence inner loop control is mainly used to control a negative-sequence current component generated under an asymmetric working condition of a grid to zero, so as to prevent an overcurrent of the valve group and an overvoltage of a capacitor of a power module. A virtual grid adaption controller is mainly used for positive-sequence and negative-sequence inner loop voltage feedforward procedures. A positive-sequence coordinate transformation angle is an angle of a phase-locked loop, and a negative-sequence coordinate transformation angle is an angle obtained by multiplying the angle of the phase-locked loop by −1.

Embodiment 1

As shown in FIG. 1, this embodiment provides a VSC-HVDC high-frequency resonance suppression method, where the method is applicable to a virtual grid adaption controller pre-installed in a feedforward procedure of a VSC-HVDC inner loop controller, and the method includes following steps.

S1: Detect a dq-axis component of an actual AC voltage of a VSC-HVDC transmission line in real time by a sensor, and calculate an effective value of the actual AC voltage based on the dq-axis component of the actual AC voltage, where a calculation formula of the actual AC voltage is as follows:

$$\text{Effective value of the actual } AC \text{ voltage} = \sqrt{V_{sd}^2 + V_{sq}^2}$$

In the above formula, $V_{sd}$ and $V_{sq}$ respectively represent voltages of a d-axis component and a q-axis component in the dq-axis component.

S2: Compare the effective value of the actual AC voltage with a preset voltage threshold ranging from 0.7 pu to 0.9 pu, where if the effective value of the actual AC voltage is greater than the voltage threshold, a dq-axis component of a virtual voltage does not affect a small change of the actual voltage; or if the effective value of the actual AC voltage decreases from 1 pu to less than the voltage threshold, a fault may occur in the VSC-HVDC transmission line, and a pulse signal of certain duration is generated in a power system and sent to the virtual grid adaption controller, where the duration of the pulse signal ranges from 2 ms to 15 ms.

Figure 4:
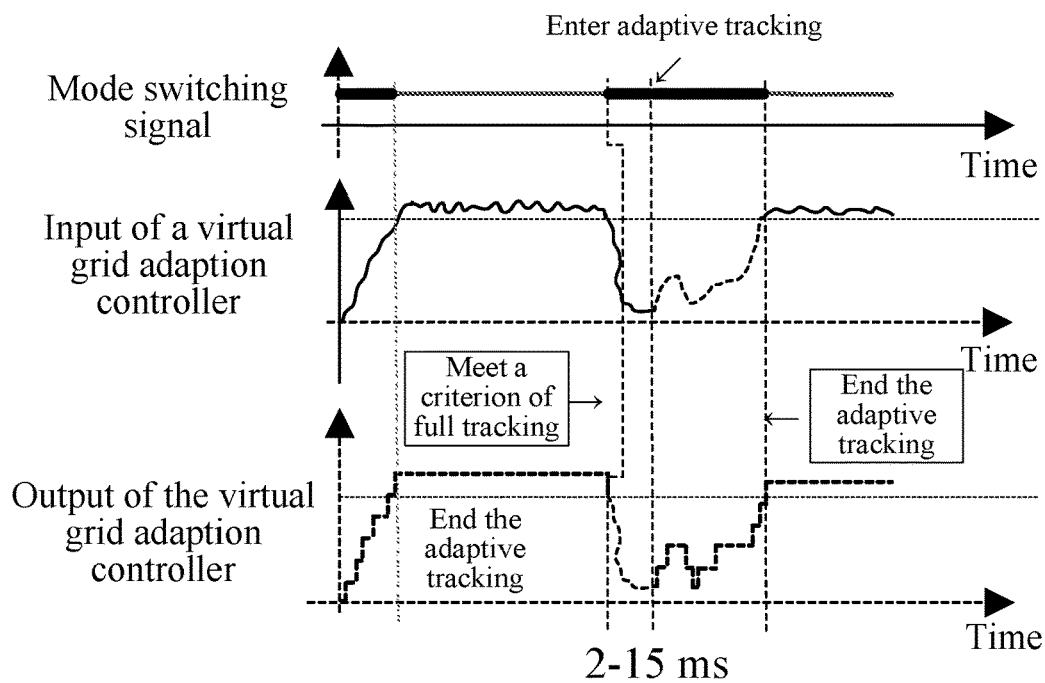
FIG. 4 is a schematic diagram of tracking of a virtual grid adaption controller in a VSC-HVDC high-frequency resonance suppression method, system, and device according to an embodiment of the present disclosure.

S3: Make the virtual grid adaption controller generate, within the duration of the pulse signal, a virtual voltage whose dq-axis component is completely equal to the dq-axis component of the actual AC voltage, so as to track the actual AC voltage accurately and in real time and improve dynamic characteristics of the system; and end full tracking and perform adaptive tracking when tracking time of the virtual grid adaption controller for the actual AC voltage reaches a preset time threshold, as shown in FIG. 4.

S4: Detect a dq-axis component of a current actual AC voltage, calculate an effective value of the current actual AC voltage based on the dq-axis component of the current actual AC voltage, calculate a deviation between the dq-axis component of the current actual AC voltage and a dq-axis component of a virtual voltage at the end of the tracking if the effective value of the current actual AC voltage is less than the voltage threshold, correct, based on the deviation, the virtual voltage output by the virtual grid adaption controller, perform the adaptive tracking for an actual electrical quantity by increasing or decreasing a fixed step size according to a specific rule, and end the adaptive tracking when it is detected that the effective value of the actual AC voltage is greater than the voltage threshold ranging from 0.7 pu to 0.9 pu and the fault in the VSC-HVDC transmission line is cleared.

Embodiment 2

As shown in FIG. 1, this embodiment provides a VSC-HVDC high-frequency resonance suppression method, where the method is applicable to a virtual grid adaption controller pre-installed in a feedforward procedure of a VSC-HVDC transmission line, and the method includes following steps.

S1: Collect an actual AC voltage of a VSC-HVDC transmission line in real time.

The actual AC voltage is transformed in a dq coordinate system to obtain a positive-sequence dq-axis component and a negative-sequence dq-axis component of the actual AC voltage, where the dq-axis component includes a d-axis component and a q-axis component. An effective value of the actual AC voltage is calculated based on the positive-sequence dq-axis component and the negative-sequence dq-axis component of the actual AC voltage. A calculation formula of the effective value of the actual AC voltage is as follows:

$$\text{Effective value of the actual } AC \text{ voltage} = \sqrt{V_{sd}^2 + V_{sq}^2}$$

In the above formula, $V_{sd}$ and $V_{sq}$ respectively represent voltages of the d-axis component and the q-axis component in the dq-axis component.

S2: Compare the effective value of the actual AC voltage with a preset voltage threshold ranging from 0.7 pu to 0.9 pu, where if the effective value of the actual AC voltage is greater than the voltage threshold, a dq-axis component of a virtual voltage does not affect a small change of the actual voltage; or if the effective value of the actual AC voltage decreases from 1 pu to less than the voltage threshold, a fault may occur in the VSC-HVDC transmission line, and a pulse signal of certain duration is generated in a power system and sent to the virtual grid adaption controller, where the duration of the pulse signal ranges from 2 ms to 15 ms, and the duration of the pulse signal should not be too short or too long. If the duration of the pulse signal is too short, dynamic characteristics of the system cannot be improved; if the duration of the pulse signal is too long, high-frequency resonance is caused between VSC-HVDC and AC systems.

S3: Make the virtual grid adaption controller generate, within the duration of the pulse signal, a virtual voltage whose dq-axis component is completely equal to the dq-axis component of the actual AC voltage, so as to track the actual AC voltage accurately and in real time and improve the dynamic characteristics of the system; and end full tracking and perform adaptive tracking when tracking time of the virtual grid adaption controller for the actual AC voltage reaches a preset time threshold, as shown in FIG. 4.

S4: Detect a dq-axis component of a current actual AC voltage, calculate a deviation between the dq-axis component of the current actual AC voltage and a dq-axis component of a virtual voltage at the end of the tracking, correct, based on the deviation, the virtual voltage output by the virtual grid adaption controller, perform the adaptive tracking for an actual electrical quantity by increasing or decreasing a fixed step size according to a specific rule, and end the adaptive tracking when it is detected that the effective value of the actual AC voltage is greater than the voltage threshold, namely, 0.9 pu, and the fault in the VSC-HVDC transmission line is cleared.

Figure 5:
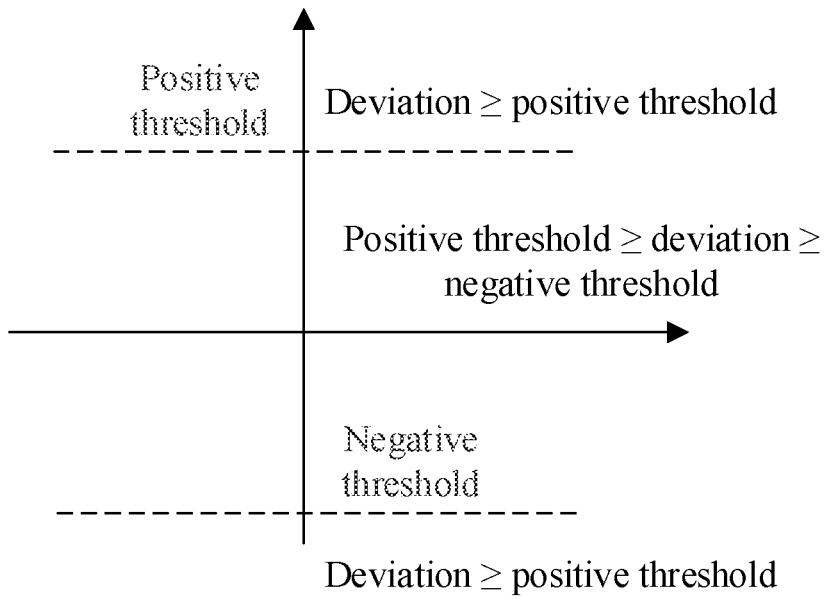
FIG. 5 shows relationships between a deviation and positive and negative thresholds in a VSC-HVDC high-frequency resonance suppression method, system, and device according to an embodiment of the present disclosure.

It should be further noted that in the S4, the calculating a deviation between the dq-axis component of the current actual AC voltage and a dq-axis component of a virtual voltage at the end of the tracking, and correcting, based on the deviation, the virtual voltage output by the virtual grid adaption controller specifically includes:

obtaining a positive-sequence dq-axis component and a negative-sequence dq-axis component of the current actual AC voltage, calculating an average value of positive-sequence dq-axis components of N sampling points to obtain an average value of the positive-sequence dq-axis component of the actual AC voltage, and calculating an average value of negative-sequence dq-axis components of the N sampling points to obtain an average value of the negative-sequence dq-axis component of the actual AC voltage;

comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;

as shown in FIG. 5, if the deviations are between a preset positive threshold (for example, 0.075) and a preset negative threshold (for example, −0.075), taking the virtual voltage at the end of the tracking as the virtual voltage output by the virtual grid adaption controller;

if the deviations are greater than a preset positive threshold, taking a sum of the virtual voltage at the end of the tracking and a preset fixed gradient (for example, 0.2) as the virtual voltage output by the virtual grid adaption controller; or if the deviations are less than a preset negative threshold, taking a value of subtracting a preset fixed gradient (for example, 0.2) from the virtual voltage at the end of the tracking threshold as the virtual voltage output by the virtual grid adaption controller; and when it is detected that the effective value of the actual AC voltage is greater than the voltage threshold (0.7 to 0.9 pu), exiting, by the virtual grid adaption controller, the adaptive tracking, returning to a normal working condition in which the dq-axis component of the virtual electrical quantity does not affect the small change of the actual electrical quantity, and ending the process.

Figure 6:
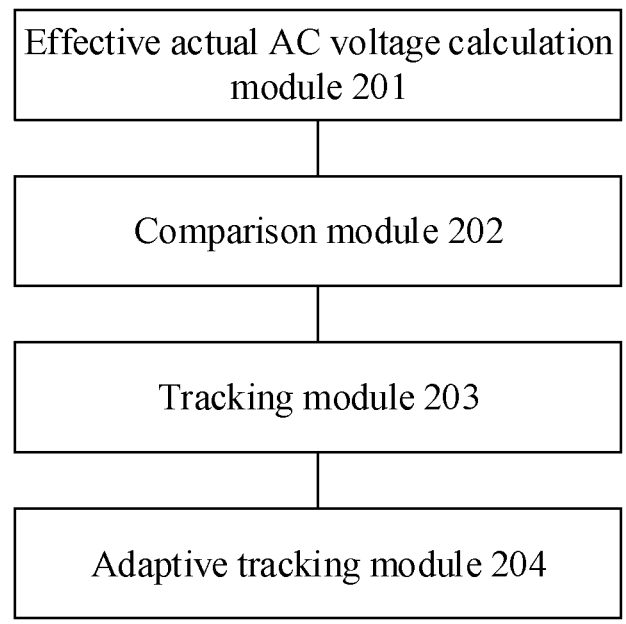
FIG. 6 is a frame diagram of a VSC-HVDC high-frequency resonance suppression system according to an embodiment of the present disclosure.

As shown in FIG. 6, a VSC-HVDC high-frequency resonance suppression system includes a virtual grid adaption controller pre-installed in a feedforward procedure of a VSC-HVDC transmission line. The system includes an effective actual AC voltage calculation module 201, a comparison module 202, a tracking module 203, and an adaptive tracking module 204.

The effective actual AC voltage calculation module 201 is configured to detect a dq-axis component of an actual AC voltage of the VSC-HVDC transmission line in real time, and calculate an effective value of the actual AC voltage based on the dq-axis component of the actual AC voltage.

The comparison module 202 is configured to compare the effective value of the actual AC voltage with a preset voltage threshold, and send a pulse signal of certain duration to the virtual grid adaption controller when the effective value of the actual AC voltage decreases from 1 pu to less than the voltage threshold.

The tracking module 203 is configured to make the virtual grid adaption controller generate, within the duration of the pulse signal, a virtual voltage whose dq-axis component is completely equal to the dq-axis component of the actual AC voltage, track the actual AC voltage, and end the tracking when tracking time of the virtual grid adaption controller for the actual AC voltage reaches a preset time threshold.

The adaptive tracking module 204 is configured to detect a dq-axis component of a current actual AC voltage, calculate a deviation between the dq-axis component of the current actual AC voltage and a dq-axis component of a virtual voltage at the end of the tracking, correct, based on the deviation, the virtual voltage output by the virtual grid adaption controller, perform adaptive tracking for the actual AC voltage, and end the adaptive tracking when it is detected that the effective value of the actual AC voltage is greater than the voltage threshold.

As a preferred embodiment, the effective actual AC voltage calculation module is 201 specifically configured to:
collect the actual AC voltage of the VSC-HVDC transmission line in real time, and transform the actual AC voltage in a dq coordinate system to obtain the dq-axis component of the actual AC voltage; and calculate the effective value of the actual AC voltage based on the dq-axis component of the actual AC voltage.

As a preferred embodiment, the duration of the pulse signal in the comparison module 202 ranges from 2 ms to 15 ms, and the voltage threshold ranges from 0.7 pu to 0.9 pu.

As a preferred embodiment, that the adaptive tracking module 203 calculates the deviation between the dq-axis component of the current actual AC voltage and the dq-axis component of the virtual voltage at the end of the tracking, and corrects, based on the deviation, the virtual voltage output by the virtual grid adaption controller specifically includes:

obtaining a positive-sequence dq-axis component and a negative-sequence dq-axis component of the current actual AC voltage, calculating an average value of positive-sequence dq-axis components of N sampling points for the actual AC voltage to obtain an average value of the positive-sequence dq-axis component of the actual AC voltage, and calculating an average value of negative-sequence dq-axis components of the N sampling points for the actual AC voltage to obtain an average value of the negative-sequence dq-axis component of the actual AC voltage;

comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;

if the deviations are between a preset positive threshold and a preset negative threshold, taking the virtual voltage at the end of the tracking as the virtual voltage output by the virtual grid adaption controller;

if the deviations are greater than a preset positive threshold, taking a sum of the virtual voltage at the end of the tracking and a preset fixed gradient as the virtual voltage output by the virtual grid adaption controller; or if the deviations are less than a preset negative threshold, taking a value of subtracting a preset fixed gradient from the virtual voltage at the end of the tracking threshold as the virtual voltage output by the virtual grid adaption controller; and ending the process when it is detected that the effective value of the actual AC voltage is greater than the voltage threshold.

In another implementation example, the above VSC-HVDC high-frequency resonance suppression system includes a processor, where the processor is configured to execute the above program modules stored in a memory, including the effective actual AC voltage calculation module 201, the comparison module 202, the tracking module 203, and the adaptive tracking module 204.

Figure 7:
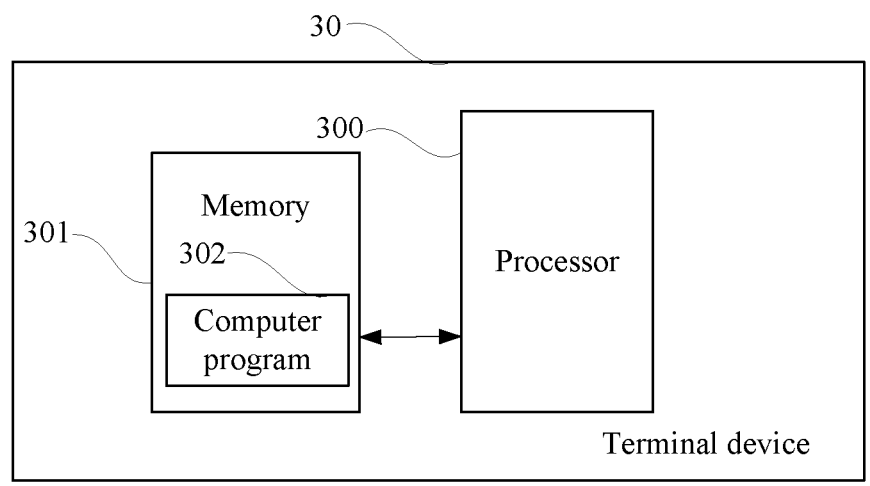
FIG. 7 is a frame diagram of a VSC-HVDC high-frequency resonance suppression device according to an embodiment of the present disclosure.

As shown in FIG. 7, a VSC-HVDC high-frequency resonance suppression device 30 includes a processor 300 and a memory 301.

The memory 301 is configured to store a computer program 302 and transmit the computer program 302 to the processor.

The processor 300 is configured to execute, according to instructions in the computer program 302, the steps of the VSC-HVDC high-frequency resonance suppression method described above.

For example, the computer program 302 may be divided into one or more modules/units. The one or more modules/units are stored in the memory 301 and executed by the processor 300 to complete the present disclosure. The one or more modules/units may be a series of computer program instruction segments capable of implementing specific functions, and the instruction segments are used for describing an execution process of the computer program 302 in the terminal device 30.

The terminal device 30 may be a computing device such as a desktop computer, a notebook, a palmtop computer, or a cloud server. The terminal device may include, but not limited to, the processor 300 and the memory 301. Those skilled in the art can understand that FIG. 7 shows only an example of the terminal device 30, does not constitute a limitation to the terminal device 30, and may include more or less components than those shown in the figure, a combination of some components, or different components. For example, the terminal device may also include input and output devices, a network access device, and a bus.

The processor 300 may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor may also be any conventional processor.

The memory 301 may be an internal storage unit of the terminal device 30, such as a hard disk or a memory of the terminal device 30. The memory 301 may alternatively be an external storage device of the terminal device 30, such as a plug-in hard disk, a smart media card (SMC), a secure digital (SD) card, or a flash card that is equipped on the terminal device 30. Further, the memory 301 may alternatively include both an internal storage unit and an external storage device of the terminal device 30. The memory 301 is configured to store the computer program and other programs and data required by the terminal device. The memory 301 may further be configured to temporarily store data that has been output or will be output.

A person skilled in the art can clearly understand that, for convenience and brevity of description, reference may be made to corresponding processes in the foregoing method embodiments for specific working processes of the foregoing systems, apparatuses, and units. Details are not described herein again.

In several embodiments provided in the present disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts are shown as units that may or may not be physical units, which may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The above integrated unit may be implemented either in a form of hardware or in a form of a software functional unit.

The integrated unit, if implemented in the form of a software functional unit and sold or used as a stand-alone product, may be stored in a computer-readable storage medium. Based on such understanding, the technical solutions of the present disclosure essentially or the part contributing to the prior art may be implemented in a form of a software product. The computer software product is stored in a storage medium, and includes several instructions for enabling a computer device (which may be a personal computer, a server, a network device, or the like) to perform all or some steps of the methods described in the embodiments of the present disclosure. The foregoing storage medium includes any medium that can store a program code, such as a universal serial bus (USB) flash disk, a mobile hard disk, a read-only memory (ROM), a random access memory (RAM), a magnetic disk, or an optical disk.

The foregoing embodiments are used only to describe the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions of the embodiments of the present disclosure.

The invention claimed is:

1. A voltage source converter based high voltage direct current (VSC-HVDC) high-frequency resonance suppression method, wherein the method is applicable to a virtual grid adaption controller pre-installed in a feedforward procedure of a VSC-HVDC inner loop controller, and the method comprises following steps:

S1: detecting a dq-axis component of an actual alternating current (AC) voltage of a VSC-HVDC transmission line in real time, and calculating an effective value of the actual AC voltage based on the dq-axis component of the actual AC voltage;

S2: comparing the effective value of the actual AC voltage with a preset voltage threshold, and sending a pulse signal of certain duration to the virtual grid adaption controller when the effective value of the actual AC voltage decreases from 1 pu to less than the voltage threshold;

S3: making the virtual grid adaption controller generate, within the duration of the pulse signal, a virtual voltage whose dq-axis component is completely equal to the dq-axis component of the actual AC voltage, tracking the actual AC voltage, and ending full tracking when tracking time of the virtual grid adaption controller for the actual AC voltage reaches a preset time threshold; and S4: detecting a dq-axis component of a current actual AC voltage, calculating an effective value of the current actual AC voltage based on the dq-axis component of the current actual AC voltage, calculating a deviation between the dq-axis component of the current actual AC voltage and a dq-axis component of a virtual voltage at the end of the tracking if the effective value of the current actual AC voltage is less than the voltage threshold, correcting, based on the deviation, the virtual voltage output by the virtual grid adaption controller, performing adaptive tracking for the actual AC voltage, and ending the adaptive tracking when it is detected that the effective value of the actual AC voltage is greater than the voltage threshold.

2. The VSC-HVDC high-frequency resonance suppression method according to claim 1, wherein the detecting a dq-axis component of an actual AC voltage of a VSC-HVDC transmission line in real time specifically comprises:
collecting the actual AC voltage of the VSC-HVDC transmission line in real time, and transforming the actual AC voltage in a dq coordinate system to obtain a positive-sequence dq-axis component and a negative-sequence dq-axis component of the actual AC voltage.

3. A VSC-HVDC high-frequency resonance suppression device, comprising a processor and a memory, wherein
the memory is configured to store program code and transmit the program code to the processor; and
the processor is configured to execute, according to instructions in the program code, the VSC-HVDC high-frequency resonance suppression method according to claim 2.

4. The VSC-HVDC high-frequency resonance suppression method according to claim 1, wherein in the S2, the duration of the pulse signal ranges from 2 ms to 15 ms.

5. A VSC-HVDC high-frequency resonance suppression device, comprising a processor and a memory, wherein
the memory is configured to store program code and transmit the program code to the processor; and
the processor is configured to execute, according to instructions in the program code, the VSC-HVDC high-frequency resonance suppression method according to claim 4.

6. The VSC-HVDC high-frequency resonance suppression method according to claim 1, wherein in the S2, the voltage threshold ranges from 0.7 pu to 0.9 pu.

7. A VSC-HVDC high-frequency resonance suppression device, comprising a processor and a memory, wherein
the memory is configured to store program code and transmit the program code to the processor; and
the processor is configured to execute, according to instructions in the program code, the VSC-HVDC high-frequency resonance suppression method according to claim 6.

8. The VSC-HVDC high-frequency resonance suppression method according to claim 1, wherein in the S4, the calculating a deviation between the dq-axis component of the current actual AC voltage and a dq-axis component of a virtual voltage at the end of the tracking, and correcting, based on the deviation, the virtual voltage output by the virtual grid adaption controller specifically comprises:
obtaining a positive-sequence dq-axis component and a negative-sequence dq-axis component of the current actual AC voltage, calculating an average value of positive-sequence dq-axis components of N sampling points to obtain an average value of the positive-sequence dq-axis component of the actual AC voltage, and calculating an average value of negative-sequence dq-axis components of the N sampling points to obtain an average value of the negative-sequence dq-axis component of the actual AC voltage;
comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;
if the deviations are between a preset positive threshold and a preset negative threshold, taking the virtual voltage at the end of the full tracking as the virtual voltage output by the virtual grid adaption controller;
if the deviations are greater than a preset positive threshold, taking a sum of the virtual voltage at the end of the tracking and a preset fixed gradient as the virtual voltage output by the virtual grid adaption controller; or
if the deviations are less than a preset negative threshold, taking a value of subtracting a preset fixed gradient from the virtual voltage at the end of the tracking threshold as the virtual voltage output by the virtual grid adaption controller; and
ending the process when it is detected that the effective value of the actual AC voltage is greater than the voltage threshold.

9. A VSC-HVDC high-frequency resonance suppression device, comprising a processor and a memory, wherein
the memory is configured to store program code and transmit the program code to the processor; and
the processor is configured to execute, according to instructions in the program code, the VSC-HVDC high-frequency resonance suppression method according to claim 8.

10. A VSC-HVDC high-frequency resonance suppression device, comprising a processor and a memory, wherein
the memory is configured to store program code and transmit the program code to the processor; and
the processor is configured to execute, according to instructions in the program code, the VSC-HVDC high-frequency resonance suppression method according to claim 1.

11. A VSC-HVDC high-frequency resonance suppression system, wherein the system is applicable to a virtual grid adaption controller pre-installed in a feedforward procedure of a VSC-HVDC inner loop controller, and the system comprises an effective actual AC voltage calculation module, a comparison module, a tracking module, and an adaptive tracking module, wherein
the effective actual AC voltage calculation module is configured to detect a dq-axis component of an actual AC voltage of a VSC-HVDC transmission line in real time, and calculate an effective value of the actual AC voltage based on the dq-axis component of the actual AC voltage;
the comparison module is configured to compare the effective value of the actual AC voltage with a preset voltage threshold, and send a pulse signal of certain duration to the virtual grid adaption controller when the effective value of the actual AC voltage decreases from 1 pu to less than the voltage threshold;
the tracking module is configured to make the virtual grid adaption controller generate, within the duration of the pulse signal, a virtual voltage whose dq-axis component is completely equal to the dq-axis component of the actual AC voltage, track the actual AC voltage, and end full tracking when tracking time of the virtual grid adaption controller for the actual AC voltage reaches a preset time threshold; and
the adaptive tracking module is configured to detect a dq-axis component of a current actual AC voltage, calculate an effective value of the current actual AC voltage based on the dq-axis component of the current actual AC voltage, calculate a deviation between the dq-axis component of the current actual AC voltage and a dq-axis component of a virtual voltage at the end of the tracking if the effective value of the current actual AC voltage is less than the voltage threshold, correct, based on the deviation, the virtual voltage output by the virtual grid adaption controller, perform adaptive tracking for the actual AC voltage, and end the adaptive tracking when it is detected that the effective value of the actual AC voltage is greater than the voltage threshold.

12. The VSC-HVDC high-frequency resonance suppression system according to claim 11, wherein the effective actual AC voltage calculation module is specifically configured to:
   collect the actual AC voltage of the VSC-HVDC transmission line in real time, and transform the actual AC voltage in a dq coordinate system to obtain a positive-sequence dq-axis component and a negative-sequence dq-axis component of the actual AC voltage; and calculate the effective value of the actual AC voltage based on the positive-sequence dq-axis component and the negative-sequence dq-axis component of the actual AC voltage.

13. The VSC-HVDC high-frequency resonance suppression system according to claim 11, wherein the duration of the pulse signal in the comparison module ranges from 2 ms to 15 ms, and the voltage threshold ranges from 0.7 pu to 0.9 pu.

14. The VSC-HVDC high-frequency resonance suppression system according to claim 11, wherein that the adaptive tracking module calculates the deviation between the dq-axis component of the current actual AC voltage and the dq-axis component of the virtual voltage at the end of the tracking, and corrects, based on the deviation, the virtual voltage output by the virtual grid adaption controller specifically comprises:
   obtaining a positive-sequence dq-axis component and a negative-sequence dq-axis component of the current actual AC voltage, calculating an average value of positive-sequence dq-axis components of N sampling points for the actual AC voltage to obtain an average value of the positive-sequence dq-axis component of the actual AC voltage, and calculating an average value of negative-sequence dq-axis components of the N sampling points for the actual AC voltage to obtain an average value of the negative-sequence dq-axis component of the actual AC voltage; and comparing the average value of the positive-sequence dq-axis component of the actual AC voltage and the average value of the negative-sequence dq-axis component of the actual AC voltage with an amplitude of the dq-axis component of the virtual voltage at the end of the full tracking separately, and calculating deviations;
   if the deviations are between a preset positive threshold and a preset negative threshold, taking the virtual voltage at the end of the tracking as the virtual voltage output by the virtual grid adaption controller;
   if the deviations are greater than a preset positive threshold, taking a sum of the virtual voltage at the end of the tracking and a preset fixed gradient as the virtual voltage output by the virtual grid adaption controller; or
   if the deviations are less than a preset negative threshold, taking a value of subtracting a preset fixed gradient from the virtual voltage at the end of the tracking threshold as the virtual voltage output by the virtual grid adaption controller; and
   ending the process when it is detected that the effective value of the actual AC voltage is greater than the voltage threshold.

* * * * *